United States Patent
Albers, Jr.

(10) Patent No.: US 6,834,620 B2
(45) Date of Patent: Dec. 28, 2004

(54) DOUBLE-RELEASE BAR FOR A COW STANCHION APPARATUS

(76) Inventor: Teo Albers, Jr., 6241 Joaquin St., Chino, CA (US) 91710

( * ) Notice: Subject to any disclaimer, the term of this patent is extended or adjusted under 35 U.S.C. 154(b) by 0 days.

(21) Appl. No.: 10/669,486

(22) Filed: Sep. 24, 2003

(65) Prior Publication Data

US 2004/0154554 A1 Aug. 12, 2004

Related U.S. Application Data

(63) Continuation-in-part of application No. 10/361,134, filed on Feb. 6, 2003, now Pat. No. 6,776,124.

(51) Int. Cl.[7] .............................................. A01K 15/04
(52) U.S. Cl. ..................................................... 119/740
(58) Field of Search ................................ 119/739, 740, 119/741, 738

(56) References Cited

U.S. PATENT DOCUMENTS

| | | | |
|---|---|---|---|
| 1,835,923 A | * 12/1931 | Babson | ........................ 119/741 |
| 4,037,566 A | 7/1977 | Albers | |
| 4,051,813 A | 10/1977 | Albers | |
| 4,185,592 A | 1/1980 | Albers, Sr. | |
| 4,476,815 A | 10/1984 | Albers, Sr. | |
| 4,495,897 A | 1/1985 | Albers, Sr. | |
| 4,867,105 A | 9/1989 | Hatfield | |
| 4,930,452 A | 6/1990 | DaSilveira | |
| 5,309,869 A | 5/1994 | Albers, Jr. | |
| 5,645,015 A | * 7/1997 | DaSilveira | ................... 119/741 |
| 6,352,052 B1 | * 3/2002 | Albers, Jr. | ................... 119/524 |
| 6,615,768 B2 | * 9/2003 | Fornes | ........................ 119/524 |
| 6,651,593 B2 | * 11/2003 | Fornes | ........................ 119/750 |

FOREIGN PATENT DOCUMENTS

DE          4041882 A1 * 7/1992  ............ A01K/1/06

* cited by examiner

Primary Examiner—Michael J. Carone
Assistant Examiner—Bethany L. Griles
(74) Attorney, Agent, or Firm—Fulwider Patton Lee & Utecht, LLP

(57) ABSTRACT

Cow stanchion apparatus having a fixed support structure that carries a plurality of pairs of like double release stanchion bars which simultaneously swing towards and away from one another to control movement of cattle relative to such apparatus. The stanchion release bars are disposed in the path of vertically movable flaps which lock and unlock the stanchion release bars for relative swinging movement. The flaps are operatively connected to a positioner rod that is manipulated by a dairyman.

13 Claims, 14 Drawing Sheets

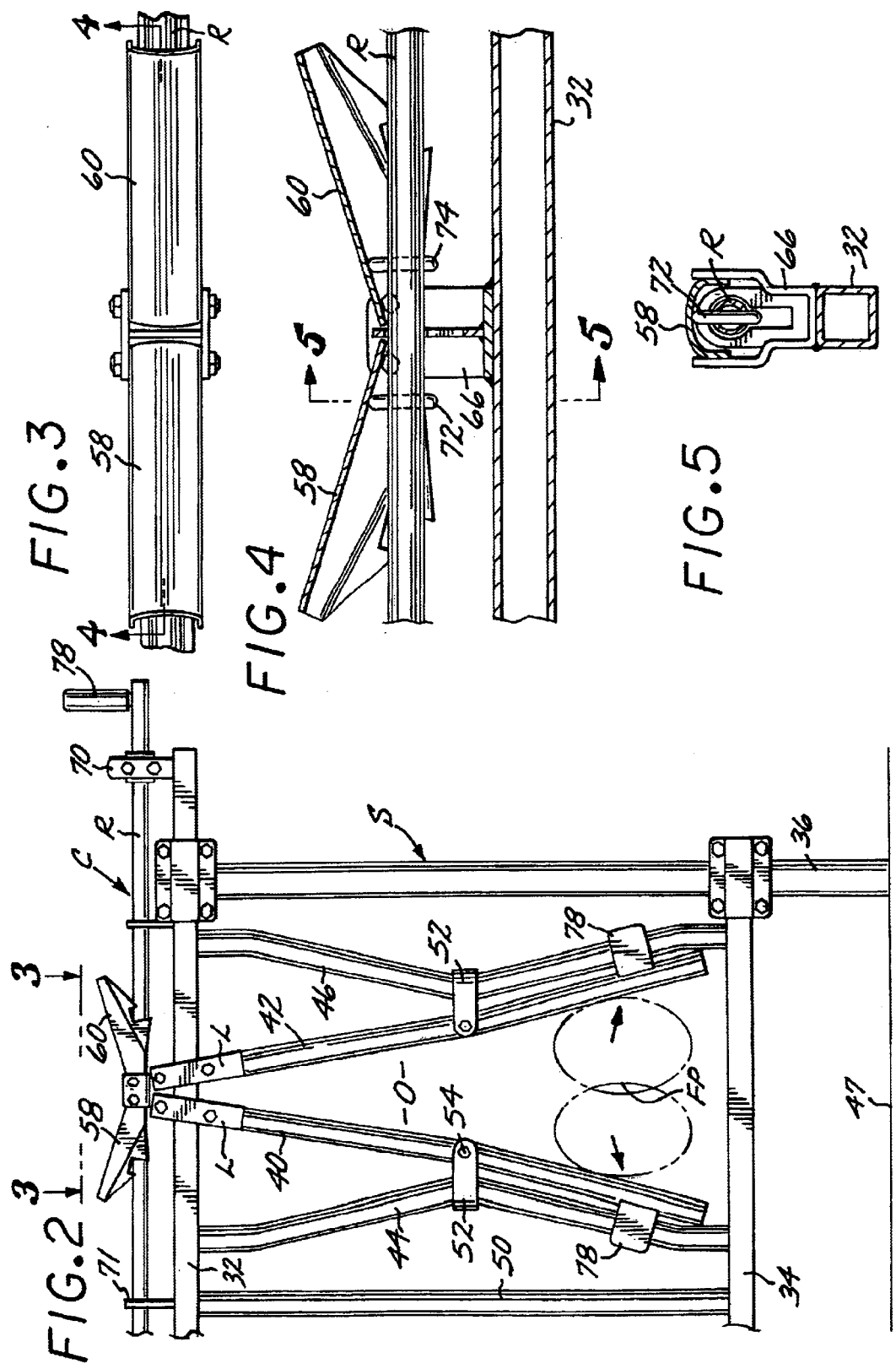

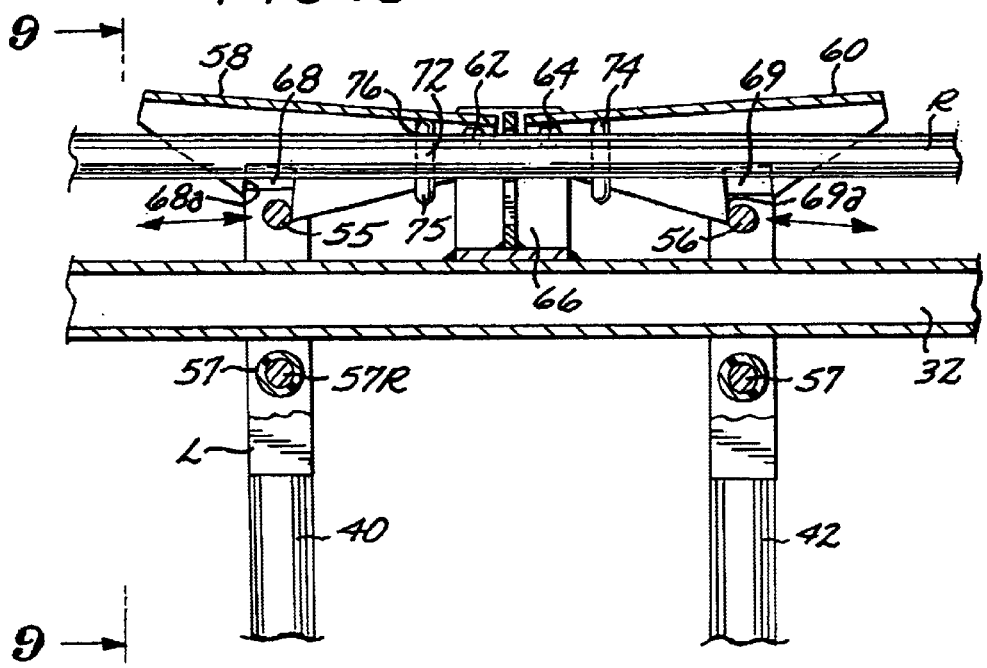
FIG. 8
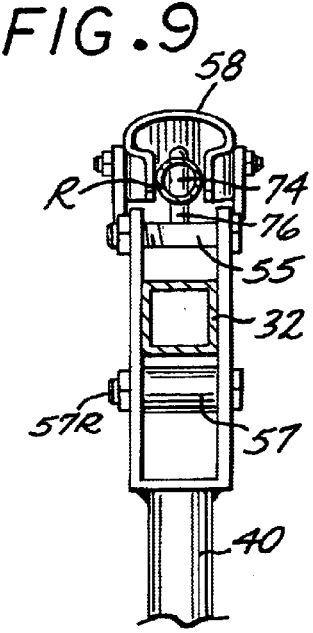
FIG. 9
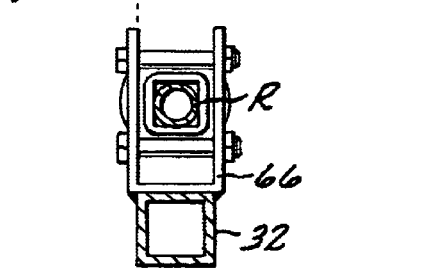
FIG. 10
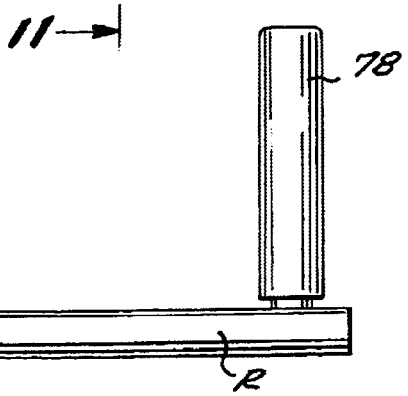
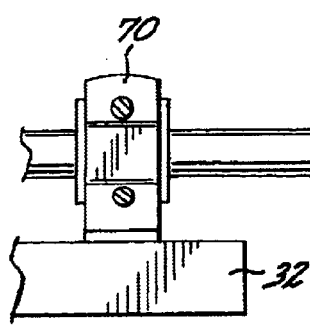
FIG. 11

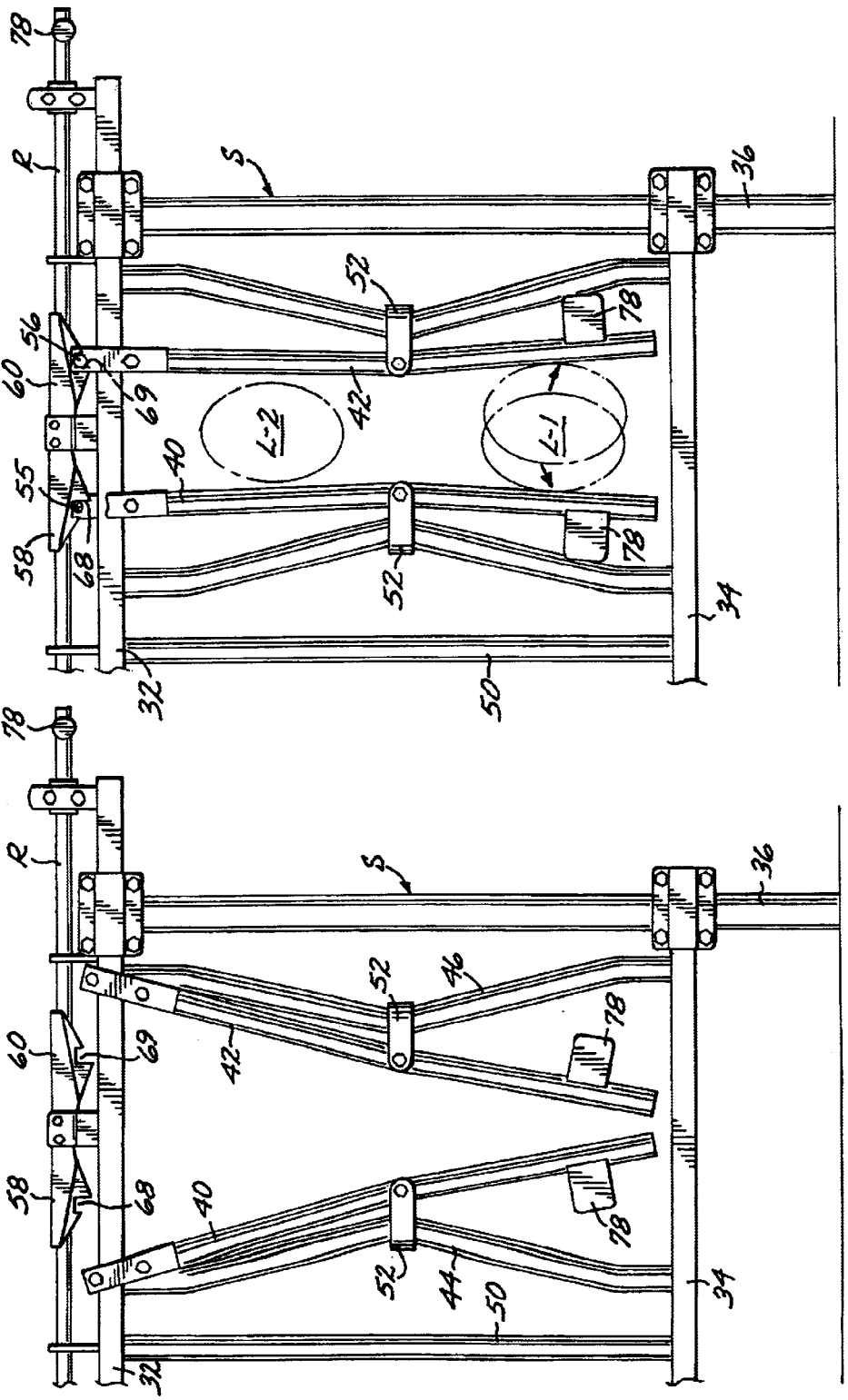

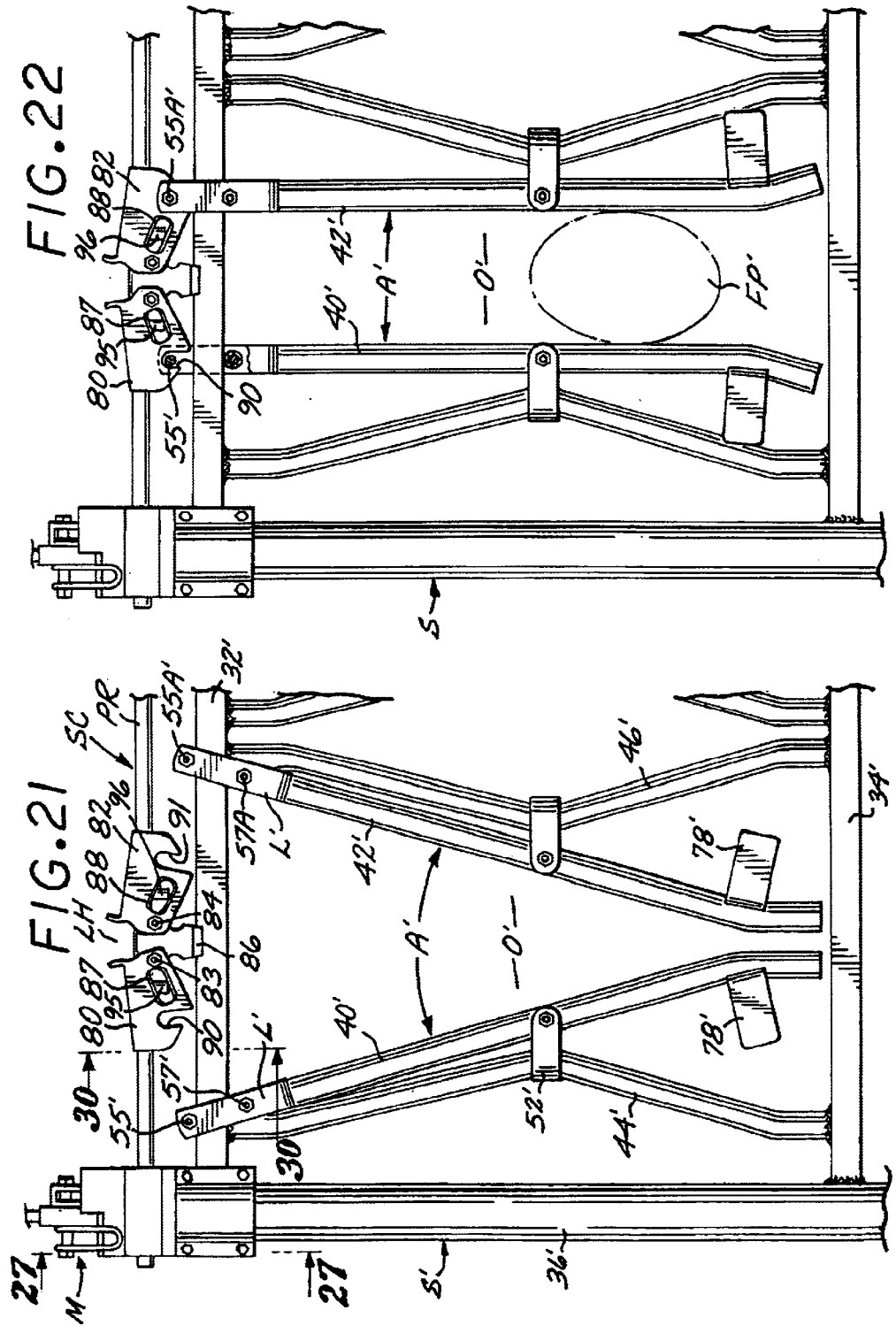

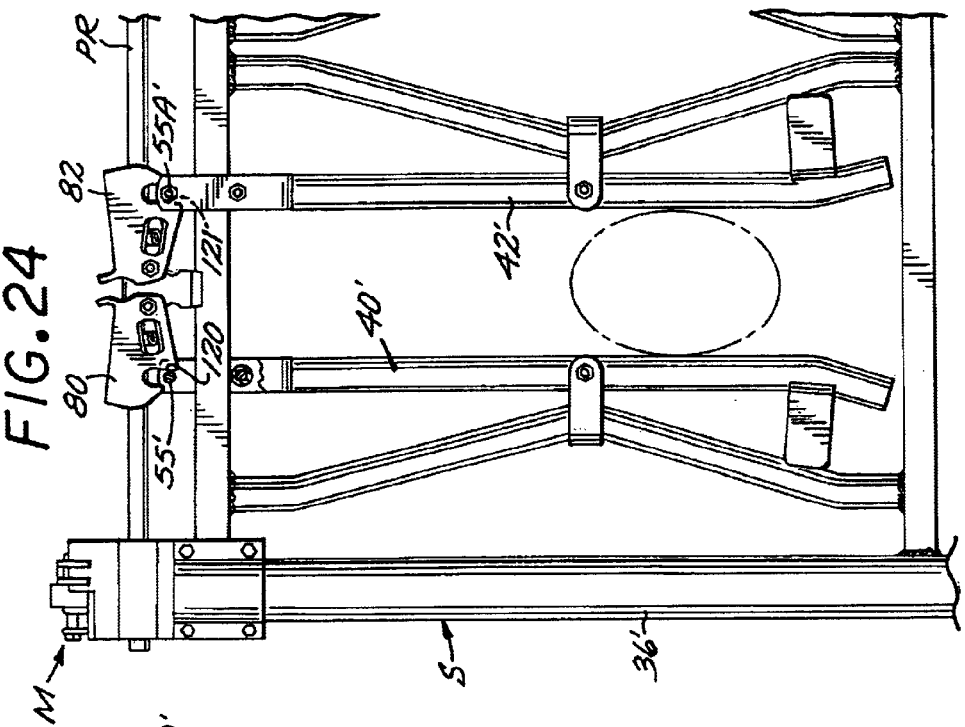
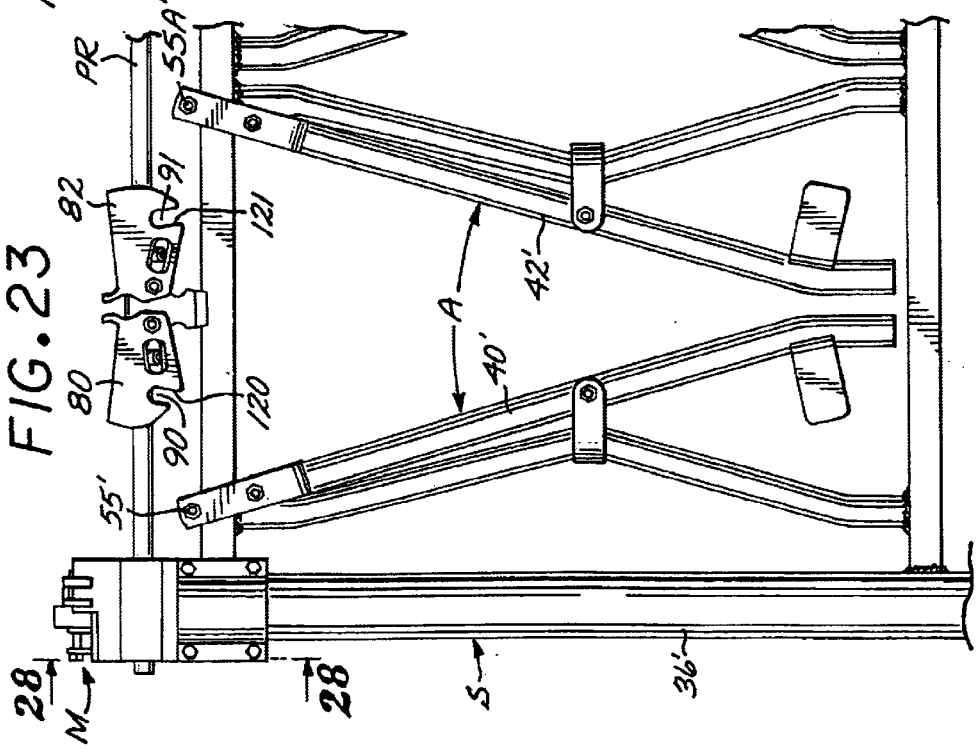

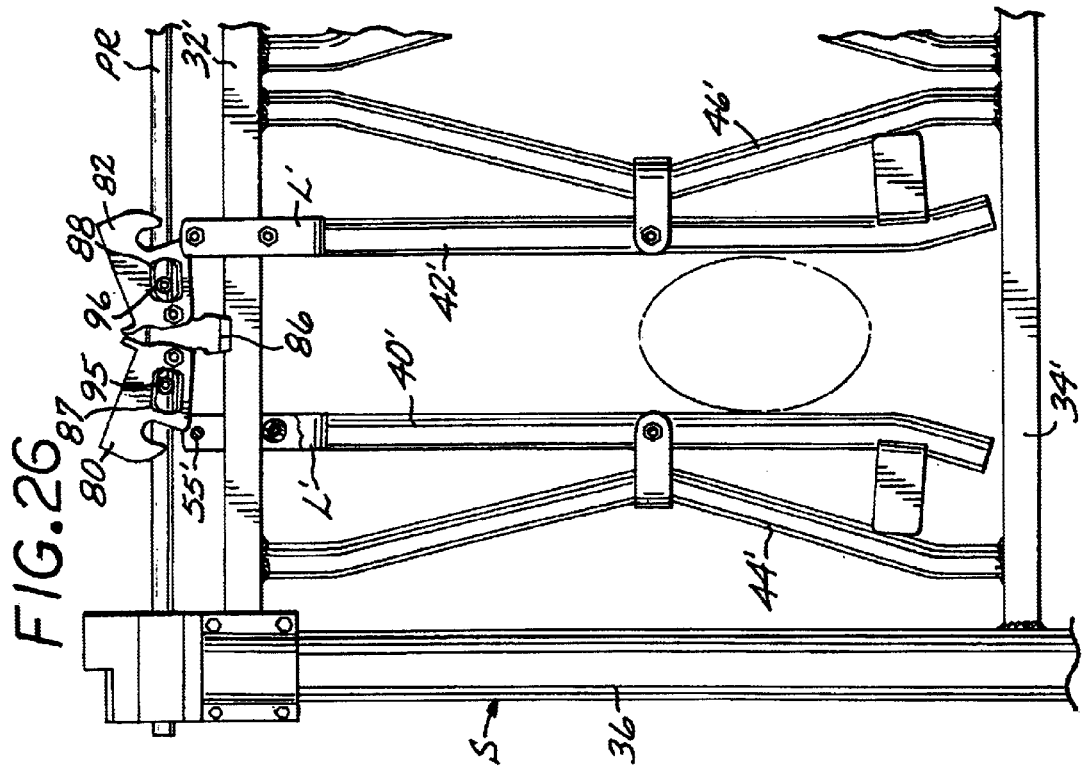
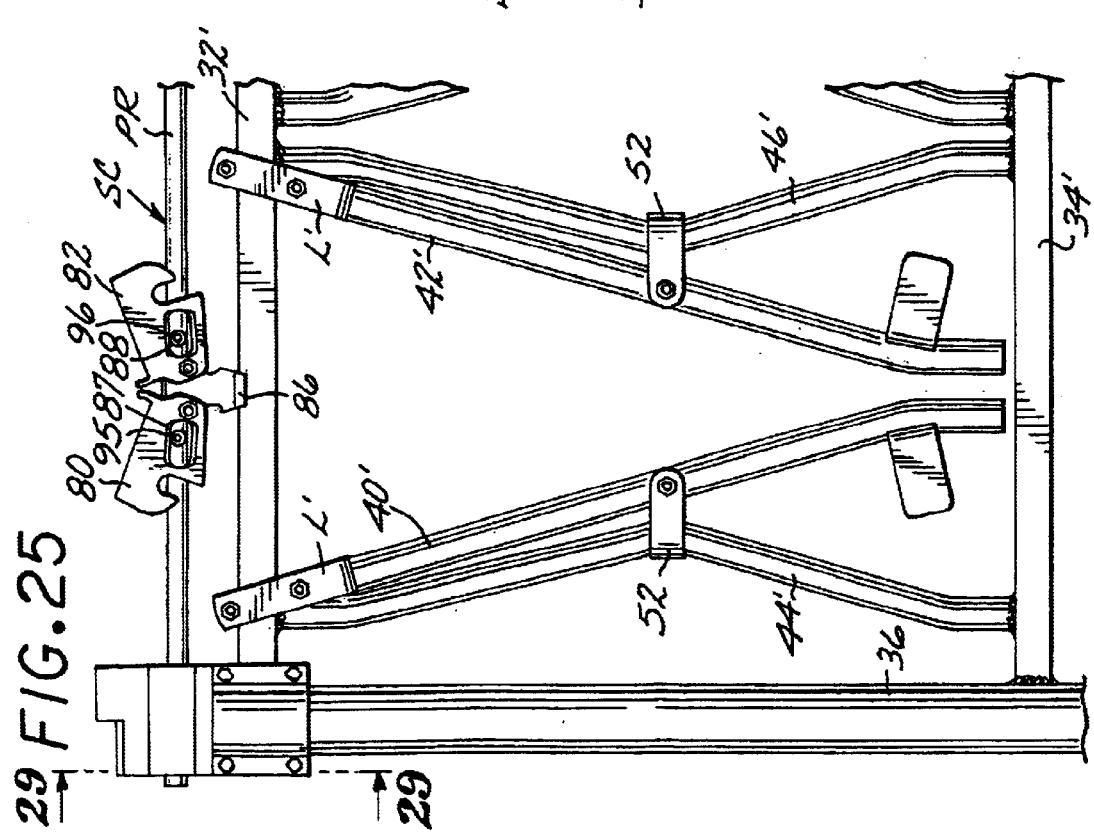

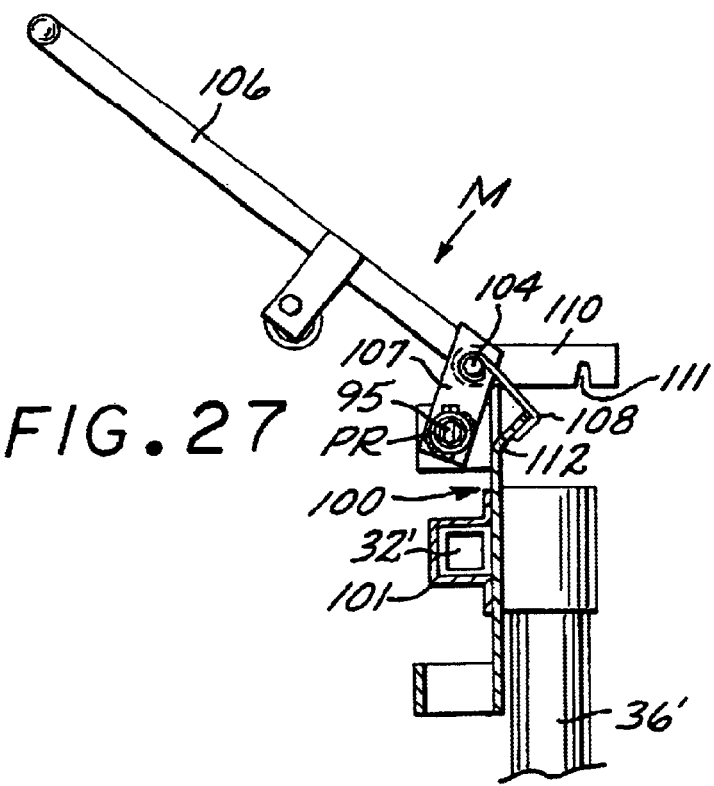
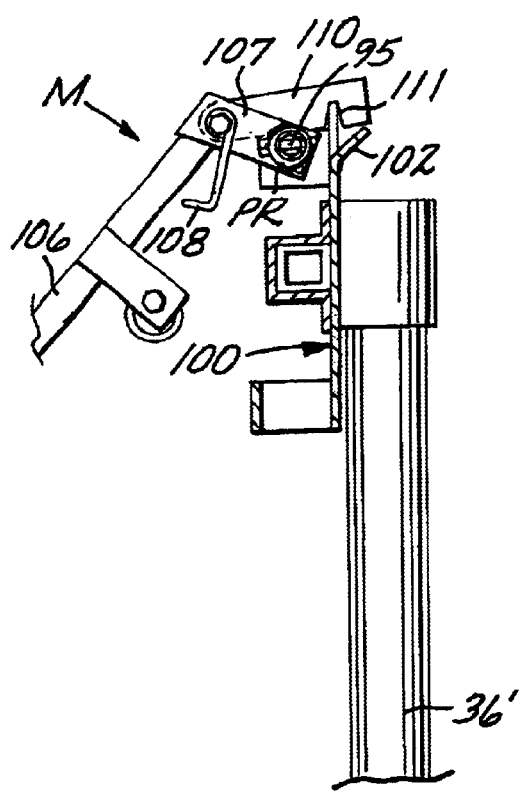
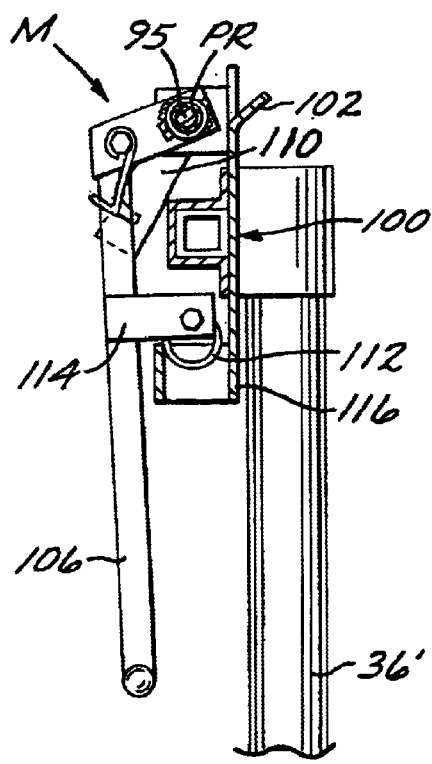
FIG. 27
FIG. 28
FIG. 29

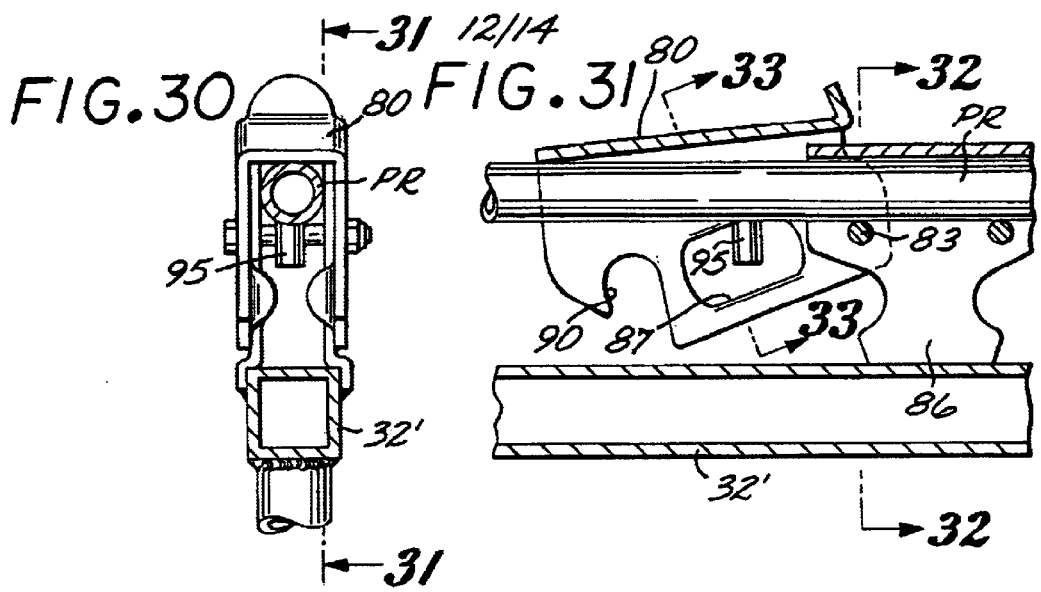
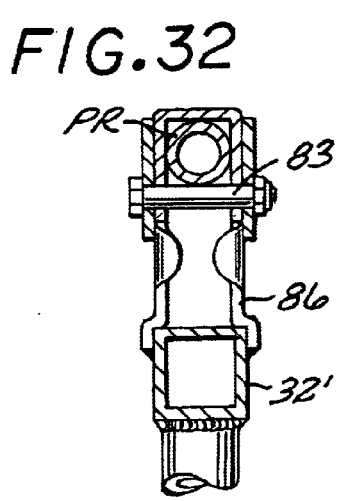
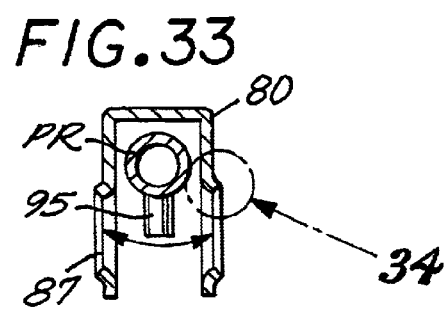
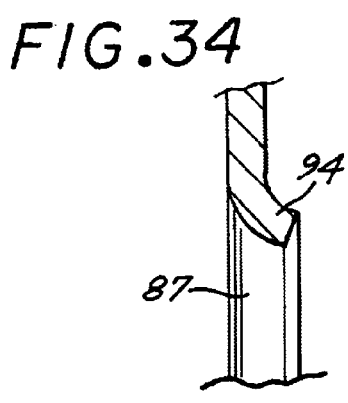
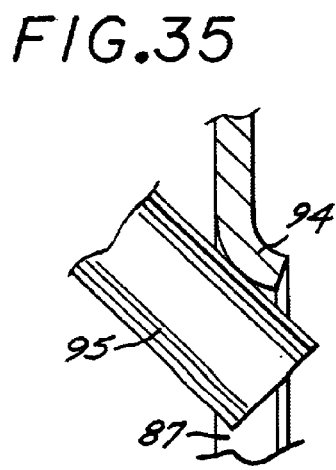

DOUBLE-RELEASE BAR FOR A COW STANCHION APPARATUS

CROSS-REFERENCE TO RELATED APPLICATION

This is a continuation-in-part of my patent application Ser. No. 10/361,134 filed Feb. 6, 2003 now U.S. Pat. No. 6,776,124.

BACKGROUND OF THE INVENTION

The present invention relates to cattle stanchion apparatus and more particularly to an improved cattle stanchion apparatus utilizing double release stanchion bars. Prior cattle stanchion apparatus have utilized single release stanchion bars for controlling movement of cattle into and out of such stanchion apparatus. Examples of such prior cattle stanchion apparatus are shown in Albers U.S. Pat. Nos. 4,037,566; 4,051,813; 4,185,592; 4,476,815; and 4,495,897. See also Hatfield U.S. Pat. No. 4,867,105 and DaSilveira U.S. Pat. No. 4,930,452.

SUMMARY OF THE INVENTION

The improved cattle stanchion apparatus of the present invention utilizes a plurality of pairs of like pivoted release stanchion bars in place of the pivoted single release stanchion bars employed in prior art cattle stanchion apparatus. The double-release stanchion bar arrangement of the present invention permits a shorter travel of the release stanchion bars for locking up the cattle, provides a more positive and quicker locking up of the cattle, requires half the effort to lock up the cattle, provides a wider opening for the cattle, and allows bulls to enter the stanchion apparatus, rather than solely cows. The wider opening also allows for a more inviting entry for timid or short cows.

The most important advantage of the cattle stanchion apparatus of the present invention is that it allows for greater cow comfort, and applies less stress to the cows, resulting in increased milk production as compared to prior art cattle stanchion apparatus. In this regard, conventional prior art cow stanchion apparatus generally include a plurality of like fixed stanchion and release structures, each release stanchion being pivotally secured to a fixed stanchion. A cow enters the head opening defined between a release stanchion and its fixed stanchion when the cow's head engages the release stanchion. During feeding, a cow swings its head as she reaches for feed. During such swinging movement, the cow's neck contacts the hard unyielding surface of the fixed stanchion as she reaches for food causing discomfort to the cow. Contact of the cow's neck with the hard surface of the fixed stanchion can result in chafing of a cow's skin when she fights to reach for feed located at the sides of her feeding stall.

The cattle stanchion apparatus of the present invention solves the above-described problem by providing a plurality of like cow feeding stations each having a release stanchion assembly which includes a pair of release stanchion bars pivotally supported for free swinging movement towards and away from one another when engaged by the neck of a feeding cow as such cow swings her head to reach her feed. Accordingly, the cow does not have to rub her neck on a hard fixed stanchion bar when she reaches for feed located at the sides of her feeding stall. The cow will therefore feel comfortable during feeding, stay in the cattle stanchion longer, and accordingly consume more feed than she would if confined in a prior art stanchion apparatus. Higher food consumption results in higher milk production. Moreover, since the release stanchion release bars swing with the cow's neck as she reaches for food, chafing of the cow's neck can be eliminated.

Another advantage of the cattle stanchion apparatus of the present invention is that its operation is not affected by extreme temperature conditions.

Other objects and advantages of the present invention will become apparent from consideration of the following detailed description taken in conjunction with the accompanying drawings.

BRIEF DESCRIPTION OF THE DRAWINGS

FIG. 2 is a broken front elevational view of the apparatus of FIG. 1 showing the release stanchion bars in a cattle feeding position;

FIG. 3 is a top plan view taken in enlarged scale along line 3—3 of FIG. 2;

FIG. 4 is a vertical sectional view taken in further enlarged scale along line 4—4 of FIG. 3;

FIG. 5 is a vertical sectional view taken along line 5—5 of FIG. 4;

FIG. 8 is an enlarged view of the upper portion of FIG. 7;

FIG. 9 is a vertical sectional view taken along line 9—9 of FIG. 8;

FIG. 10 is a vertical sectional view taken in enlarged scale along line 10—10 of FIG. 7;

FIG. 11 is a broken vertical sectional view taken in further enlarged scale along line 11—11 of FIG. 10;

FIGS. 12 and 13 are partial front elevational views of the apparatus of FIG. 1 showing the the cattle stanchion apparatus of the present invention in a cow locked-in position;

FIGS. 21–26 are broken front elevational views of a second embodiment of a double-release cattle stanchion bar apparatus of the present invention;

FIGS. 27, 28 and 29 are broken side elevational views of a lockable handle utilized with the cattle stanchion apparatus of the present invention.

FIG. 30 is a vertical cross-sectional view taken in enlarged scale along line 30—30 of FIG. 21;

FIG. 31 is a vertical sectional view taken along line 31—31 of FIG. 30;

FIG. 32 is a vertical sectional view taken along 32—32 of FIG. 31;

FIG. 33 is an inclined sectional view taken along line 33—33 of FIG. 31;

FIG. 34 is an enlarged view of the area designated 34 in FIG. 33;

FIG. 35 is a view similar to FIG. 34 showing a lifting stud engaging the sidewall of a latch head;

DETAILED DESCRIPTION OF PREFERRED EMBODIMENTS

Figure 1:
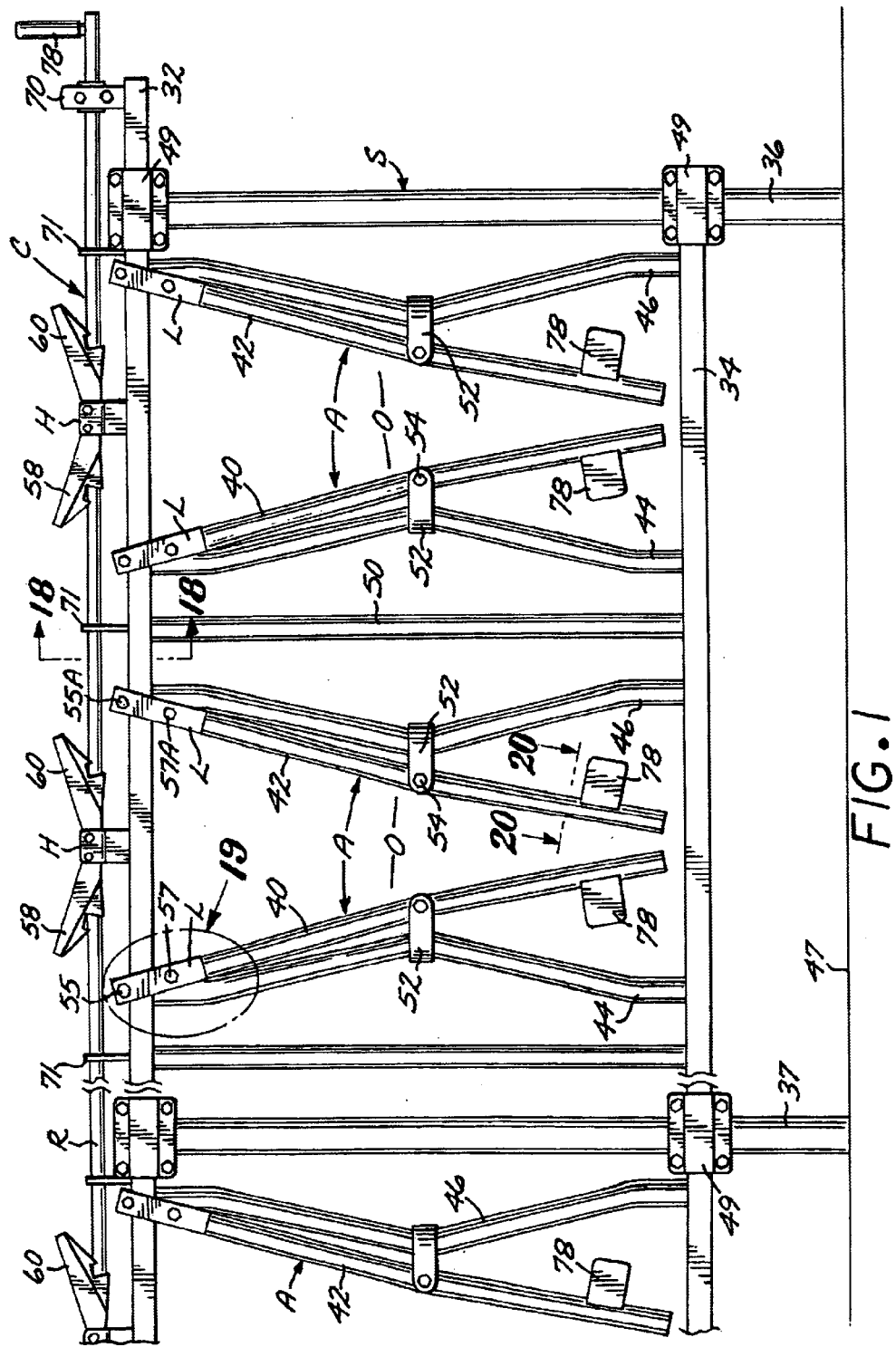
FIG. 1 is a front elevational view of a first embodiment of the double-release cattle stanchion apparatus of the present invention showing the release stanchion bars thereof ready to move into a cattle feeding position.
Figure 6:
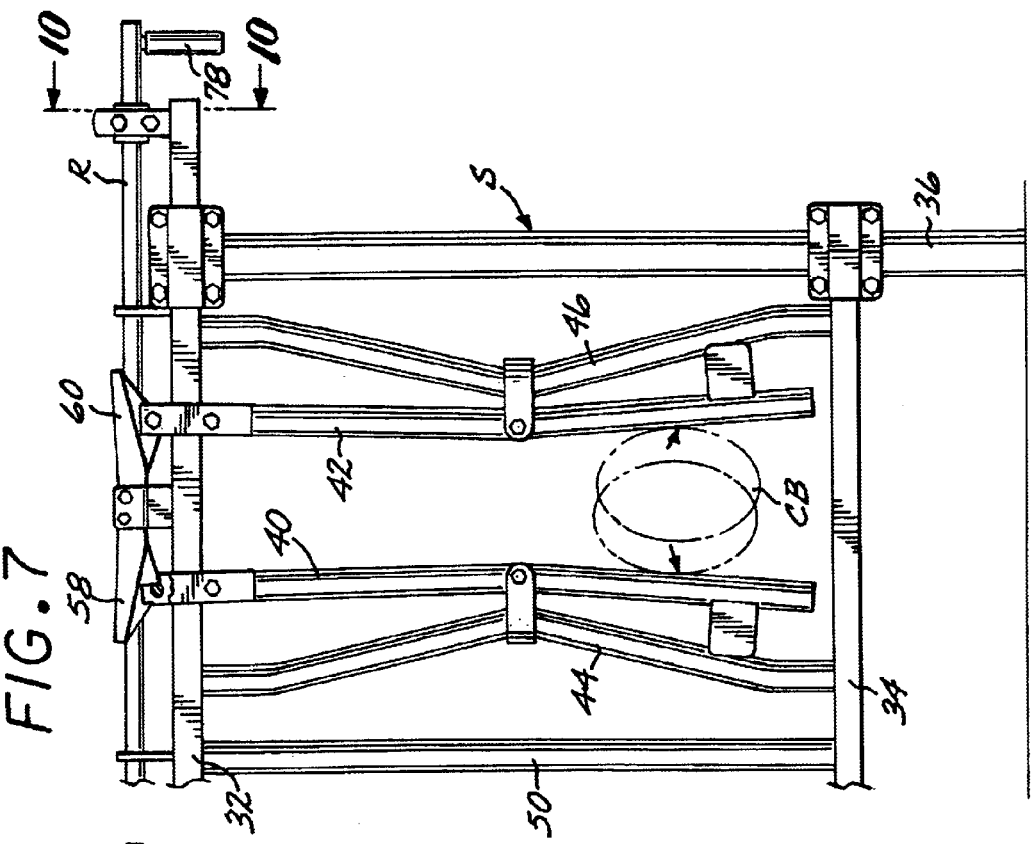
FIGS. 6 and 7 are a broken partial front elevational views showing the parts of the cattle stanchion apparatus arranged to permit training of younger cows.
Figure 7:
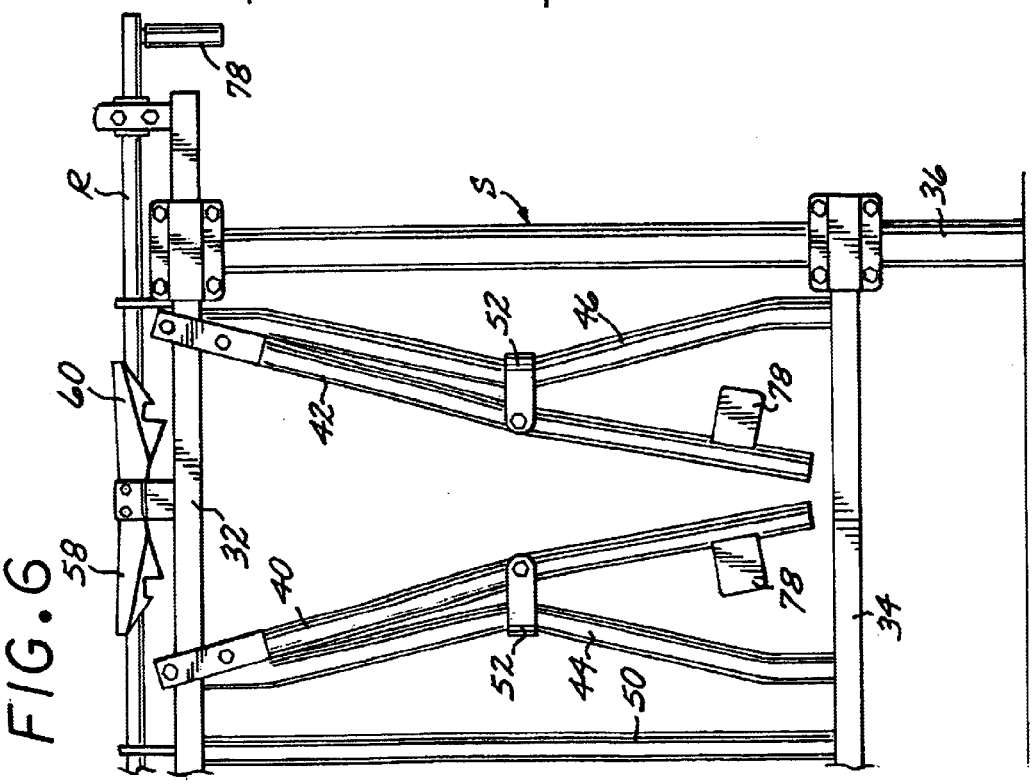

Referring to FIGS. 1–20 of the drawings, there is shown a first embodiment of the double-release cattle stanchion bar apparatus embodying the present invention. Such apparatus includes a fixed support structure S, which includes top and bottom rails 32 and 34 respectively, shown fixed to an end post 36 and a plurality of intermediate posts 37. A plurality of double release stanchion bar assemblies A are spaced along the length of the top and bottom rails. Each assembly includes a pair of facing release stanchion bars 40, 42 of like construction and mirror images of one another. The intermediate portions of each release stanchion bar is pivotally connected to the intermediate portion of a fixed stanchion 44, 46. The intermediate portions of the fixed stanchions extend out of the vertical position towards one another. With this arrangement, the release stanchion bars 40, 42 can swing simultaneously towards and away from one another in accordance with the operation of a release stanchion bar control assembly C that includes a latch bracket L secured to the upper end of each release stanchion bar, a horizontal positioner rod R rotatably carried by the top rail 32, and a plurality of latch heads H secured to the top rail 32 above the mid-section of the release stanchion assemblies A. It should be understood that the space between the release stanchion bars 40, 42 defines a cow head-receiving opening O.

More particularly, the end posts 36 and intermediate posts 37 are securely attached at their lower ends to a support surface 47. Straps 49 connect the top and bottom rails to the posts. Auxiliary posts 50 are rigidly affixed as by welding outwardly of each fixed stanchion bar 44, 45. The intermediate portion of the release stanchion bars are pivotally attached to the intermediate portion of its respective fixed stanchion 44, 46 by a U-shaped bracket 52 having its bifurcated ends connected by a pivot bolt 54. The upper end of each release stanchion bar 40, 42 includes a latch bracket L of bifurcated construction, as shown particularly in FIGS. 8 and 9. A horizontal latch pin 55, 55A extends between the bifurcated upper ends of each latch bracket L, while a second horizontal stop pin 57, 57A extends below the sides of each bracket below top rail 32. The stop ins are engageable with the upper interior portions of the fixed stanchion bars. Stop pins 57 and 57A include a coating of sound deadening material such as rubber or nylon 57R. This spatial geometry permits the latch brackets L, and accordingly the release stanchion arms 40, 42 to freely travel along the top rail 32 during certain operations of the cattle stanchion apparatus of the present invention.

As shown particularly in FIGS. 2, 3, 4 and 14–16, each latch head H includes a pair of inverted U-shaped mirror-image flaps 58 and 60 pivotally connected at their proximate ends by pivot bolts 62 and 64 to a bifurcated support strap 66 having its lower end affixed as by welding to the top rail 32 above the mid-section of the release stanchion assemblies A. The lower portion of each latch head flap 58 and 60 is formed with an upwardly extending lock slot 68, 69, which selectively receive the latch pins 55, 56 of the latch brackets L. As shown particularly in FIGS. 8, and 14–16, the proximate sides of lock slots 68, 69 extend below the remote sides of the lock slots to define cow training abutment surfaces 68a and 69a. The flaps 58 and 60 of the latch heads pivot between a lower latched position, a raised unlatched position and an intermediate cow training position under the control of horizontal positioner rod R which is rotationally carried by a main end support bearing 70 and intermediate spacer bearings 71 attached at their lower ends to the upper surface of the top rail 32. The positioner rod R is provided with pairs of flap lifting studs 72, 74 in vertical alignment with the intermediate portion of each of the flaps. As shown in FIGS. 8, 9, and 17, each flap lifting stud includes a major length 75 and a minor length 76. It should be noted that the stanchion release bars 40, 42 are provided at their lower ends with weights 78 that automatically bias such bars to their cattle feeding position of FIG. 1. Such weights 78 also block a cow from inserting her neck into the space between the lower portions of the fixed and release stanchion bars.

In the operation of the aforedescribed cattle stanchion apparatus 5, in FIG. 1 the parts thereof are shown in a cattle feeding position where cows (not shown) are free to move into and out of each head-receiving opening O. At this time the latch brackets L can freely slide along the top rail 32 since the flap lifting pins 72, 74 are arranged horizontally out of the path of the latch pins 55, 56 of the latch brackets. This results from the fact that the positioner rod R is disposed in its position of FIGS. 1, 4, and 5 wherein the major length 75 of the flap lifting studs 72, 74 extend upwardly, in which position such studs have engaged the underside of the flaps and lifted the free ends of the flaps out of the path of the latch pins 55, 56 of the latch brackets L. A cow can then insert her head into the upper portion of the opening O and move her head downwardly to a feeding position designated FP in FIG. 2 as the upper ends of the stanchion release bars 40, 42 swing simultaneously towards one another under the pressure applied by the cow's neck. A cow is also free to back out of such feeding position and again move forward into such feeding position without any attention from a dairyman.

It has been found that the use of two stanchion release bars, rather than a single stanchion release bar permits the use of a wider space between the lower position of the stanchion release bars, as compared to the space between a stanchion release bar and its supporting fixed stanchion bar of a conventional cattle stanchion apparatus, providing increased cow comfort during feeding. Also, should a cow fall while feeding there is a reduced chance of choking because of such wider space. The wider space can accept the neck of a bull, as well as that of a cow. Also, it requires less time for a cow to urge the double stanchion release bars 40, 42 apart than to effect swinging of a single stanchion bar, since the two release bars move only half the distance of the single release bar of a conventional cattle stanchion apparatus.

Referring now to FIGS. 6–9, positioner rod R has been rotated by handle 78 to dispose lifting studs 72, 74 with their minor lengths 76 pointed upwardly to abut the underside of flaps 58 and 60 so as to raise the flaps to a cow training position. As shown in FIG. 8, the upper ends of the stanchion release bars 40, 42 can now swing towards one another until latch pins 55, 55A engage cow training abutment surface 68a, 69a of flaps 58 and 60. Such engagement prevents the lower portion of the stanchion release bars from swinging out of a vertically extending position and therefore a cow's head is blocked from extending into a feeding position, as indicated at CB in dotted outline in FIG. 7. The parts of the cattle stanchion apparatus can be arranged in a cow training position to prevent cows, especially young and short cows, from entering the stanchion apparatus from the opening defined by the lower portion of the release stanchions below pivot bolts 54 because such cows initially feel it is easier for a cow to assume a feeding position using this route. If the control assembly C is arranged to lock the cows in a feeding position and a cow inserts her head partially into the space between the lower portions of a pair of release stanchions and then backs out of such space the stanchion release bars can swing into a cow locked-out position as the cow backs out of the opening. It should be understood that one untrained cow could move along the stanchion assembly and in this manner randomly lock out several cows from entering into a feeding position. Also, should an untrained cow nudge only a single release bar into a locked position, another cow can still insert her head between the locked release bar and the adjacent non-locked release bar to assume a feeding position. This is not possible with a conventional single stanchion release bar. An untrained cow will learn that she cannot enter into a feeding position by inserting her neck between the lower portion of the stanchion release bars after several attempts to separate the release bars by inserting her neck between the lower portion of the stanchion release bars. She will then realize she must move the stanchion release bars to a feeding position by inserting her neck between the space between the upper portion of the stanchion release bars.

Referring now to FIGS. 12–15, when the positioner rod R is rotated to the horizontal position shown in such drawings, the flap lifting studs 72, 74 are moved away from underside of the flaps 58, 60 permitting such flaps to automatically pivot downwardly to their lower positions. Accordingly, after a cow backs out of her stall, the weights 78 cause the upper portion of the stanchion release bars 40,42 to swing towards one another from their position of FIG. 12 to that of FIG. 13. The latch pins 55, 55A will then snap into the lock notches 68, 69 of the flaps thereby automatically and positively locking such bars into a cow locked-in feeding position, designated L-1 in FIG. 13, or into a locked-out position designated L-0 in FIG. 13. When a dairyman wishes to return the stanchion release bars 40, 42 to a cow release position he can rotate positioner rod R to its position of FIG. 1 where the major length 75 of the flap lifting studs 72, 74 extend upwardly to raise the flaps 58, 60 and thereby free the latch pins 55, 55A from lock notches 68 and 69. The cows can then freely withdraw from the stanchion apparatus.

Figure 14:
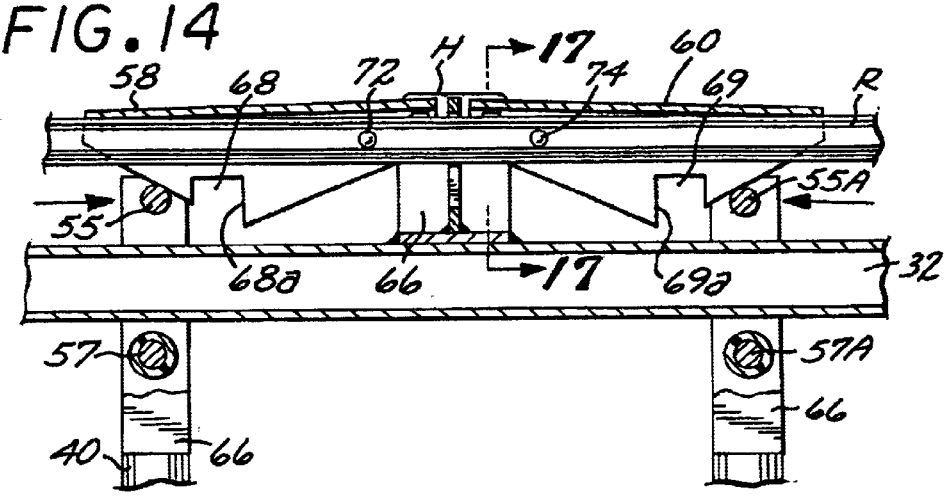
FIGS. 14, 15 and 16 show the operation of a release stanchion bar latching mechanism employed in the first embodiment of the cattle stanchion apparatus of the present invention.
Figure 15:
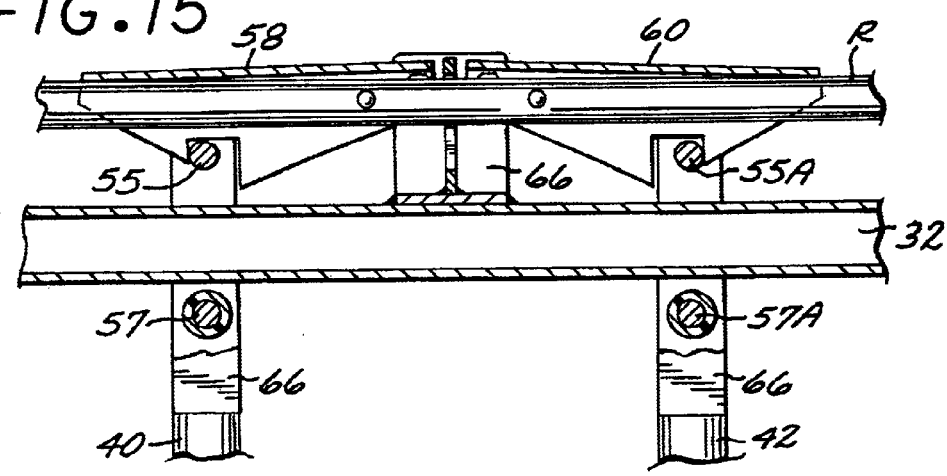
Figure 16:
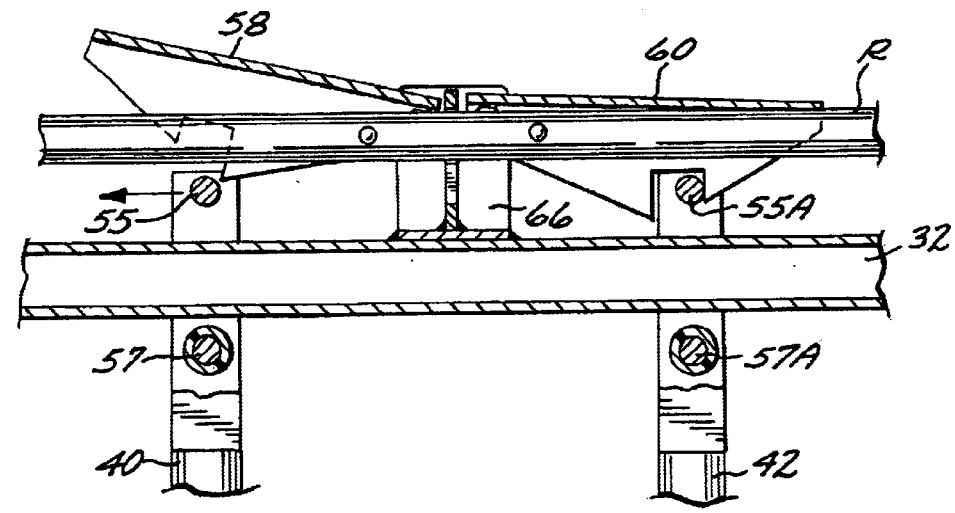
Figure 17:
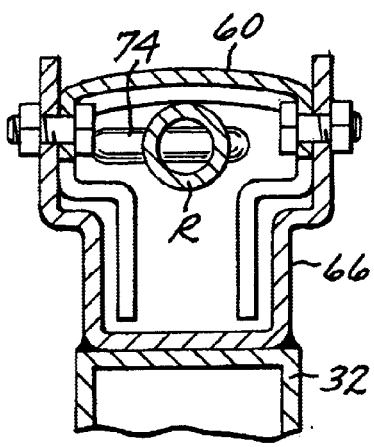
FIG. 17 is a vertical sectional view taken in enlarged scale along line 17—17 of FIG. 14.
Figure 18:
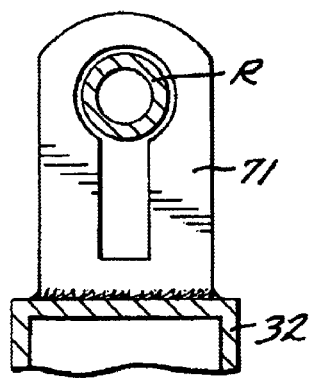
FIG. 18 is a vertical sectional view taken along line 18—18 of FIG. 1.
Figure 19:
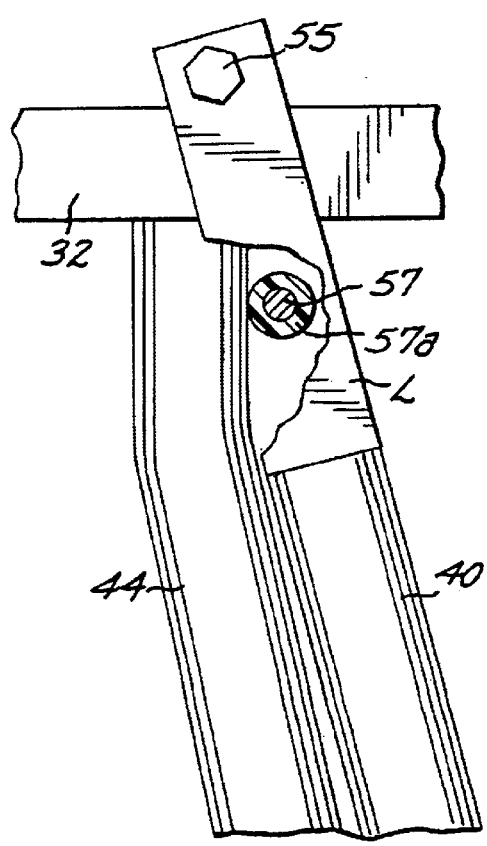
FIG. 19 is a broken front elevational view of the upper end of a release stanchion bar showing a noise deadening feature of the cattle stanchion apparatus of the present invention.
Figure 20:
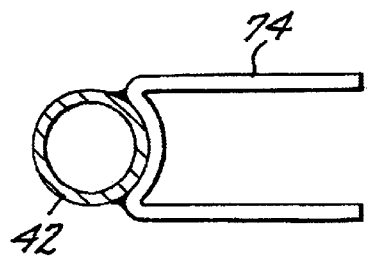
FIG. 20 is a cross sectional view taken in enlarged scale along line 20—20 of FIG. 1.
Figure 36:
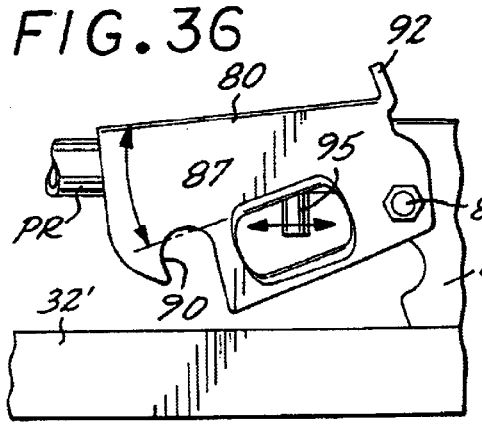
FIGS. 36–40 are views similar to FIG. 31 showing operation of a latch head.

Referring now to FIG. 16, should a cow go down while the stanchion release bars are disposed in their locked-in position of FIGS. 13–15, a dairyman can easily manually lift one or both of the flaps 58,60 to raise the lock slots free of latch pin 55 or 55A. One or both of the release bars 40 can then be manually swung outwardly away to thereby increase the width of the opening between the lower parts of the release stanchions sufficiently that the downed cow can be withdrawn from the cattle stanchion apparatus.

Referring now to FIGS. 21–44, there is shown another preferred form of cattle stanchion apparatus embodying the present invention utilizing a second embodiment of latching system for controlling operation of the stanchion release bars. Like components of the stanchion bar assemblies in FIGS. 21–44 bear primed reference numbers with respect to FIGS. 1–20.

The second form of cattle stanchion apparatus shown in FIGS. 21–44 includes a fixed support structure S' which includes top and bottom rails 32' and 34', respectively, shown fixed to an end post 36' and a plurality of intermediate posts (not shown). A plurality of double-release stanchion bar assemblies A' are spaced along the length of the top and bottom rails. Each stanchion bar assembly A' includes a pair of stanchion release bars 40', 42' of like construction and mirror images of one-another. The intermediate portions of each stanchion release bar is pivotally connected to the intermediate portion of a fixed release stanchion carrier bar 44', 46'. The intermediate portions of the fixed release stanchion carrier bars extend out of the vertical position towards one-another. With this arrangement the stanchion release bars 40' and 42' can swing simultaneously towards and away from one-another in accordance with the operation of a second embodiment of stanchion release bar control mechanism SC. Such control mechanism includes a latch bracket L' secured to the upper end of each stanchion release bar, 40' and 42', a horizontal positioner PR rotatably carried by the top rail 32', a plurality of latch heads LH secured to the top rail 32' intermediate each stanchion bar assembly A' and a positioner rod locking handle member M. The space between the stanchion release bars 40' and 42' defines a cattle head-receiving opening O'.

More particularly, the endpost 36' and intermediate posts are secured at their lower ends to a support surface in a conventional manner. The intermediate portion of the stanchion release bars 40' and 42' are pivotally attached to the intermediate portion of its respective stanchion release bar 44', 46' by a U-shaped bracket 52' having its bifurcated ends connected by pivot pin 54'. The upper end of each stanchion release bar 40', 42' includes a like latch bracket L'. Horizontal latch pins 55', 55A' extend between the bifurcated upper ends of each latch bracket L above top rail 32'. Horizontal stop pins 57', 57A' extend below the sides of each latch bracket below top rail 32'. The stop pins are encompassed by a washer or a coating of sound deadening material, such as rubber or nylon 57 R' (FIG. 40), when such pins engage the upper ends of fixed stanchion bars 44', 46'. This arrangement permits the latch brackets L', and accordingly the stanchion release bars 40', 42' to freely slide along the top rail 32' during certain operations of the second preferred form of cattle stanchion apparatus embodying the present invention.

Each latch head LH includes a pair of mirror-image flaps 80 and 82 pivotally connected at their proximate ends by pivot pins 83 and 84 to a bifurcated support strap 86 having its lower end affixed as by welding to the top rail 32' above the mid-section of the stanchion release bar assemblies A'. The intermediate lower ends of each flap 80 and 82 are formed with upwardly inclined extending elongated temperature compensation apertures 87 and 88. Outwardly of these flap apertures 87 and 88, the flaps are formed with upwardly lock slots 90 and 91. The inner upper surface of each latch head LH is formed with an upstanding finger pad 92, 93 (FIGS. 43 and 44) for a purpose to be described hereinafter. It should also be noted that the upper and lower edges of the temperature compensation apertures 87 and 88 are formed with outwardly flared lips 94 for a purpose to be described hereinafter.

Positioner rod PR fixedly supports a plurality of pairs of like, parallel flap lifting studs 95 and 96 aligned respectively with temperature compensating apertures 87 and 88 of flaps 80 and 82. These studs serve to control the vertical position of the flaps 80 and 88 relative to the latch pins 55' and 55A' of the stanchion release bars 44', 46'. When the studs 95 and 96 extend vertically downwardly, as shown in FIGS. 21, 22 and 30–33, the outer ends of the flaps 80 and 82 will be rest on the upper surface of the positioner rod PR so as to be disposed in the path of the latch pins 55', 55A'. Rotation of the positioner rod PR and hence the lifting studs through about 45° upwardly from their downwardly extending release stanchion bar locked position will partially raise the flaps 80 and 82 to their upwardly inclined cow training position of FIGS. 23 and 24, by the abutment of the studs with the lips 94. Rotation of the positioner rod PR through approximately a further 45° will cause the lifting studs 95 and 96 to lift the flaps 80 and 82 to their fully raised unlocked position shown in FIGS. 25 and 38.

Positioner rod PR is selectively moved to and locked in a position wherein the lifting studs 95 and 96 extend downwardly, an upwardly inclined position and a horizontal position by means of a positioner rod locking handle member M shown particularly in FIGS. 27, 28 and 29. Referring to these figures, the positioner rod locking handle member M includes a support plate 100 which is formed with a box 101 that encompasses the upper rail 32'. Support plate 100 is rigidly supported by the upper end of endpost 36'. The upper portion of support plate 100 is formed with a forwardly and upwardly inclined locking flange 102. The upper end of support plate 100 is provided with a pivot pin 104 which pivotally supports a manually moveable handle 106. The end of handle 106 is fixedly attached to a bifurcated strap 107 having its sides fixedly attached to the positioner rod PR whereby angular movement of the handle will effect concurrent rotation of the positioner rod. Pivot pin 104 also pivotally supports a hook 108 which is selectively engagable with the locking flange 102 to support the handle 106 in its rearwardly and upwardly inclined position of FIG. 27. Pivot pin 104 additionally pivotally supports a latchfinger 110 formed with cut-out 111. Referring again to FIG. 27, with the handle 106 positively locked in its position shown in this figure by the engagement of hook 108 with flange 102 the lifting studs 95 and 96 are secured in their downwardly extending position of FIGS. 21 and 22.

Referring now to FIG. 28, hook 108 is shown disengaged with respect to locking flange 102 and latchfinger 110 has been manually swung downwardly by a dairyman until its cut-out 111 is engaged with the upper edge of support plate 100. At this time the lifting studs 95 and 96 will be positively locked in their horizontally extending position of FIGS. 25 and 26.

Referring now to FIG. 29, the latchfinger 110 is shown disengaged from the upper end of support plate 100 and the handle 106 moved into a downwardly extending position. At this time the studs 95 and 96 will be disposed in their upwardly inclined cow training position of FIGS. 25 and 26. The handle 106 may be positively locked into its downwardly extending position of FIG. 29 by means of a lock ring 112 carried by an offset strap 114 affixed to the intermediate portion of handle 106, when such ring 12 is manually inserted within a locking socket 116 formed at the bottom of support plate 100. The handle 106 cannot be raised from its position of FIG. 29 unless the dairyman manually forces the lock ring upwardly out of the confines of the locking socket.

Figure 42:
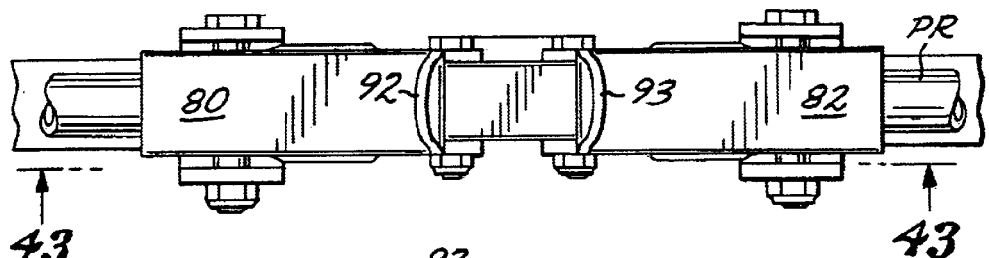
FIG. 42 is a broken top view showing a pair of the latching heads.
Figure 43:
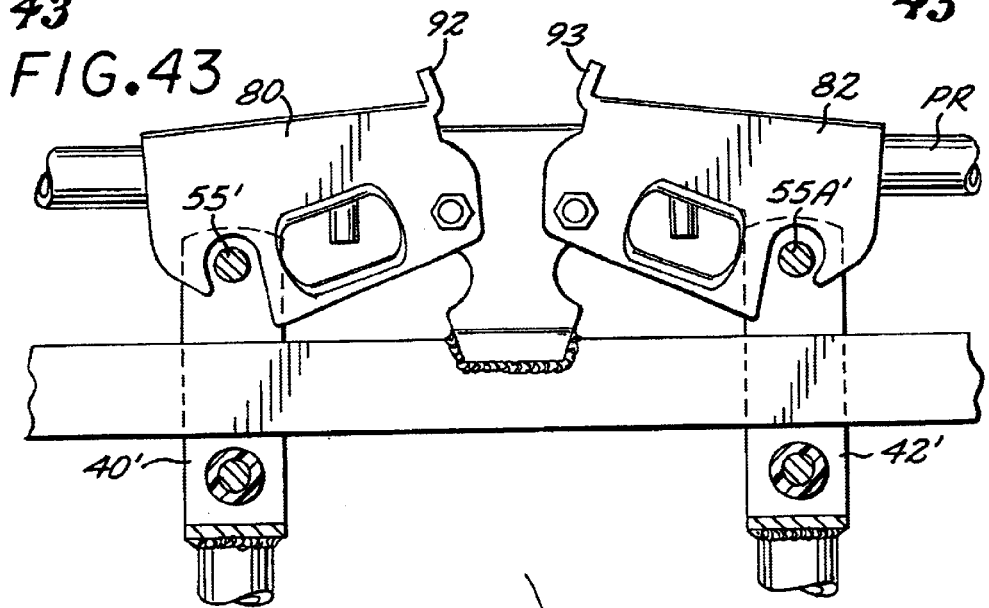
FIG. 43 is a vertical sectional view taken along line 43—43 of FIG. 42.

In the operation of the preferred form of cattle stanchion apparatus S' shown in FIGS. 21–44, in FIG. 21 the parts thereof are shown ready to be moved into a cow feeding position where cows (not shown) are free to move into and out of each head-receiving opening O'. When a cow inserts her head into the upper portion of opening O' and moves her head downwardly into a feeding position, designated FP' in FIG. 22, the upper ends of the stanchion release bars 40', 42' simultaneously swing towards one-another under the downward pressure applied by the cow's neck. The upper ends of the stanchion release bars will then cause the latch pins 55', 55A' to engage a curved cam surface 120 formed at the lower outer portions of the flaps 80 and 82 causing the lifting studs 95, 96 to exert an upward force against the flaps 80, 82 as indicated in FIG. 40, so as to lift the flaps a sufficient distance for the latch pins 55' and 55A' to snap into the lock slots 90 and 91 as shown in FIGS. 22, 42 and 43. The stanchion release bars will then be locked into their generally vertically extending positions of FIG. 22 thereby locking the cow within the stanchion apparatus S' in a feeding position until such time as the dairyman elects to free the cows from such feeding position. The positioner rod PR can be temporarily locked into its position of FIGS. 21 and 22 by arranging the parts of the handle member M in their positions of FIG. 27. In the position of the parts shown in FIGS. 22, 42 and 43, the cows can also be locked out of the stanchion apparatus.

Referring now to FIGS. 23 and 24, the parts of the cattle stanchion apparatus S' are shown in a cow training position. In such position the handle member M has been lowered so that the parts of such member M are disposed in their position of FIG. 29. In such position the positioner rod PR has rotated through approximately 45° to dispose the lifting studs 95 and 96 at a cow training upwardly inclined position.

In such position, the lifting studs will engage the sides of the flap apertures 87 and 88 so as to raise the flaps 80 and 82 from their positions of FIGS. 21 and 22 to their upwardly inclined position of FIGS. 23, 24 and 29. When a cow inserts her neck within the upper portion of opening O' to reach her feed, her neck will swing the stanchion release bars 40', 42' inwardly towards one another to the position shown in FIG. 24. When the latch pins 55', 55A' are swung inwardly to the point where they engage flat cow training abutment surfaces 120 and 121 formed on the lower, inner portions of flap notches 90 and 91, engagement of the latch pins with the abutment surfaces prevents further inward swinging movement of the stanchion release bars. Accordingly, the cow cannot move forwardly into a feeding position. The cow then backs out from between the stanchion release bars once she realizes she cannot enter between the stanchion release bars to a feeding position unless she inserts her neck through the upper portion of the opening O'; as described hereinabove with respect to the cattle stanchion apparatus of FIGS. 1–20.

Referring now to FIGS. 34 and 35, the provision of the flared lips 24 on the flap apertures 87 and 88 reduce the amount of sliding friction between the lower portion of the lifting studs 55'–56' as such studs are moved into lifting engagement with the sides of the flaps. This reduction in friction is particularly important where a large number of release stanchion assemblies are formed in a single length of stanchion apparatus.

Figure 37:
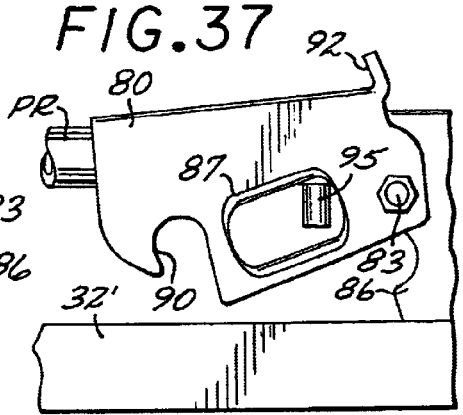
Figure 38:
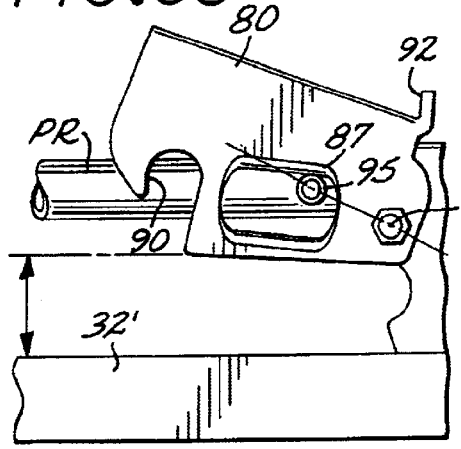
Figure 39:
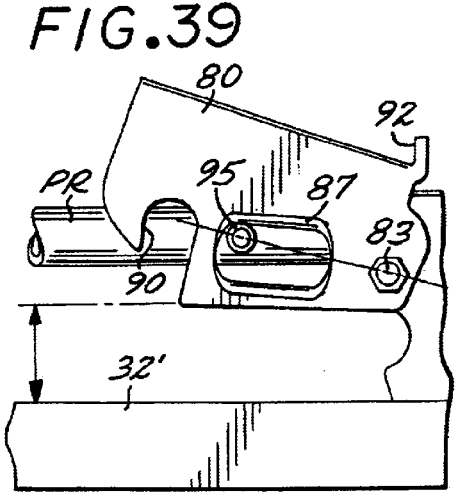
Figure 40:
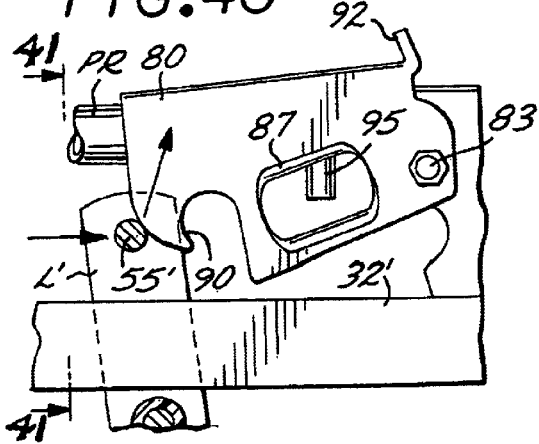
Figure 41:
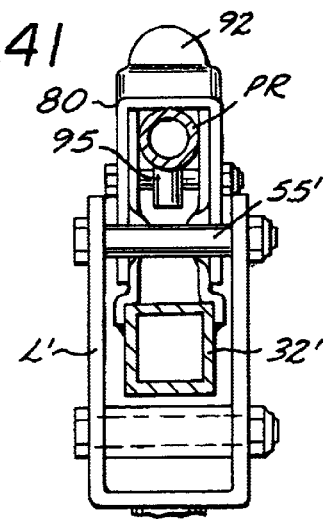
FIG. 41 is a vertical sectional view taken along line 41—41 of FIG. 40.

Referring now particularly to FIGS. 36–39, it is important to note that the temperature compensating flap apertures 87 and 88 are of slightly inclined, elongated configuration. Such elongated configuration permits the lifting studs 95 and 96 to function satisfactorily despite variations in the length of the positioner rod PR caused by the expansion and contraction of the positioner rod which occurs upon extreme temperature changes of the positioner rod relative to the frame of the stanchion apparatus S'. Thus, in FIG. 36 the lifting stud 95 is shown in its downwardly extending position under normal temperature conditions. In FIG. 37 the lifting stud 95 is shown in a second position to the right-hand side of its original position due to contraction of the positioner rod PR at extremely cold temperatures. When the positioner rod has been rotated through about 45° to its positions of FIGS. 38 and 39 the lifting stud 95 will engage the upper edge of the temperature compensating aperture 87 so as to move the flap 80 into its raised position of these figures and FIGS. 25 and 26. In FIG. 39 the positioner rod PR is shown as having increased in length due to an extremely high temperature causing lifting stud 95 to move to the left. Despite such movement to the left, the lifting stud 95 will still raise the flap 80 to its uppermost position. Provision of the elongated temperature compensating apertures 87 and 88 thereby permits effective operation of the stanchion apparatus despite elongation and contraction of the positioner rod under varying temperature conditions, since the lifting studs 95 and 96 can slide along the sloping surfaces of the apertures 87 and 88 as positioner rod PR expands and contracts while maintaining the flaps 80 and 82 in their raised position. With this arrangement it is not necessary to utilize means for adjusting such relative spacing, as with the stanchion apparatus of Albers U.S. Pat. No. RE32,728.

Figure 44:
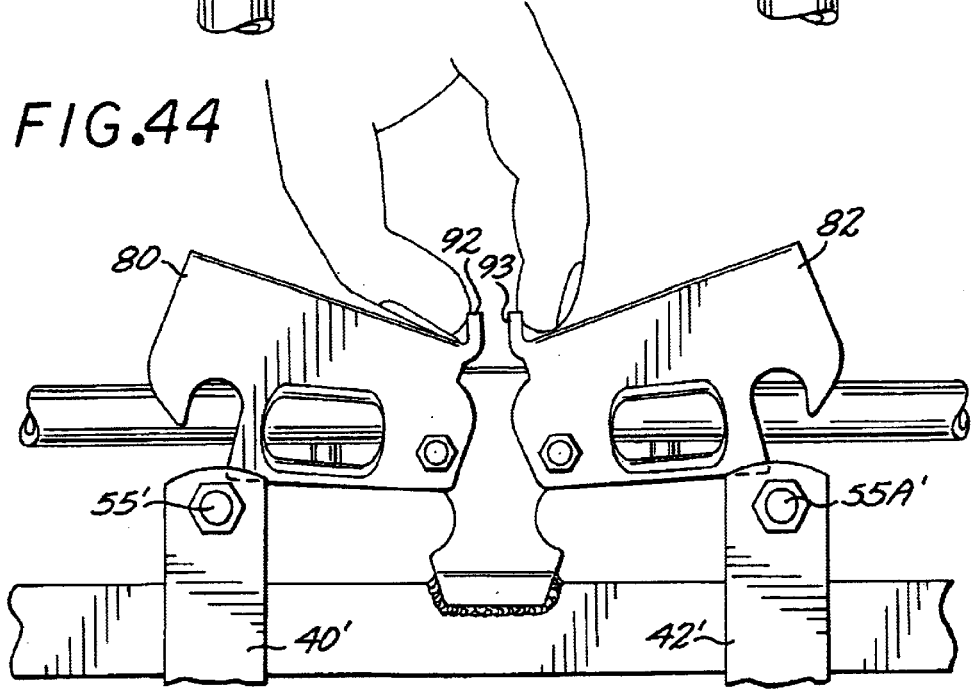
FIG. 44 is a broken front-elevational view showing the manner in which the latch heads can be manually disengaged from a locked position to permit a downed cow to be removed from the stanchion apparatus, or to simply release an individual cow.

Referring now to FIGS. 43 and 44, should a cow go down while the stanchion release bars 40' and 42' are disposed in their locked-in position of FIGS. 21 and 22 a dairyman can easily lift the flaps to their raised position by finger pads 92 and 93 to raise the flap lock notches 80 and 82 free of latch pins 55' and 55A'. One or both of the stanchion release bars 40', 42' can then be manually swung outwardly to thereby increase the width of the opening between the lower parts of the release stanchion bars sufficiently that a downed cow can be withdrawn from the cattle stanchion apparatus S'.

Those skilled in the cattle stanchion art will understand that the double-release stanchion bar feature of the embodiment of FIGS. 21–44 will provide the advantages of the double-release stanchion bar arrangement of the embodiment of FIGS. 1–20. Those skilled in the art will also understand that such advantages can be obtained with forms of stanchion release bar control assemblies other than the stanchion release bar assemblies described hereinbefore.

Various other modifications and changes may be made with respect to the forgoing description without departing from the spirit of the present invention.

I claim:

1. Cattle stanchion apparatus for controlling movement of cattle relative to such apparatus, said cattle stanchion apparatus comprising:

a fixed support structure;

a plurality of pairs of release stanchion bar assemblies supported by the fixed support structure along the length of the fixed structure;

each pair of release stanchion bar assemblies including a pair of facing double release stanchion bars pivotally connected at their intermediate portions for swinging movement towards and away from one another when engaged by a cow;

the space between each pair of stanchion release bars defining a cattle head receiving opening;

a latch bracket on the upper portion of each stanchion release bar formed with a latch pin;

latch heads on the fixed structure, each disposed above the mid-section of each of the release stanchion bar assemblies;

a pair of flaps pivotally supported by each latch head, each of the flaps being formed with a locking slot; and a positioner rod horizontally rotatably carried by the fixed support structure and having flap lifting studs arranged engageable with the flaps to raise and lower the flaps whereby the latch pins of the stanchion release bars are movable into and out of engagement with the lock slot to control the swinging movement of the stanchion release bars.

2. Cattle stanchion apparatus as set forth in claim 1, wherein the release stanchion bars are biased to automatically assume a position in which the upper ends of such stanchion bars are spaced apart.

3. Cattle stanchion apparatus as set forth in claim 1, wherein the lower portion of the release stanchion bars are weighted to cause such release stanchion bars to automatically assume a position wherein their upper ends are spaced apart.

4. Cattle stanchion apparatus as set forth in claim 1, wherein a flap can be manually moved into disengagement with its respective latch head whereby the latch head's release stanchion bar is manually moveable to an open downed cow releasing position:

latch heads on the fixed structure, each disposed above the mid-section of each of the release stanchion bar assemblies;

a pair of flaps pivotally supported by each latch head, each of the flaps being formed with a locking slot; and a positioner rod horizontally carried by the fixed support structure and having flap lifting studs arranged engageable with the flaps to raise and lower the flaps whereby the latch pins of the release stanchion bar are movable into and out of engagement with the lock slots to control the swinging movement of the release stanchion bars, with the release stanchion bars being locked in a vertically extending position when the latch pins are engaged with the lock slots and being free to undergo swinging movement when the latch pins are out of engagement with the slots.

5. Cattle stanchion apparatus for controlling movement of cattle relative to such apparatus, said cattle stanchion apparatus comprising:

a fixed support structure;

a plurality of release stanchion bar assemblies supported by the fixed structure along the length of the fixed structure;

each pair of release stanchion bar assemblies including a pair of facing double release stanchion bars pivotally connected at their intermediate portions for simultaneous swinging movement towards and away from one another;

the space between each pair of stanchion release bars defining a cattle head receiving opening;

a latch bracket on the upper portion of each stanchion release bar formed with a latch pin;

latch heads on the fixed structure, each disposed above the mid-section of each of the release stanchion bar assemblies;

a pair of flaps pivotally supported by each latch head, each of the flaps being formed with a cow training abutment surface and with a locking slot; and a positioner rod horizontally rotatably carried by the fixed structure and having flap lifting studs arranged engageable with the flaps to raise and lower the flaps whereby the latch pins of the stanchion release bar are movable into and out of engagement with the abutment surface, with the locking slots to control the swinging movement of the stanchion release bars, and with the stanchion release bars being locked in a vertical position when the latch pins are engaged with the lock slot and locked against swinging movement towards one another when the latch pins are engaged with the cow training abutment surfaces.

6. Cattle stanchion apparatus as set forth in claim 5, wherein the release stanchion bars are biased to automatically assume a position in which the upper ends of such stanchion bars are spaced apart.

7. Cattle stanchion apparatus as set forth in claim 5, wherein the lower portion of the release stanchion bars are weighted to cause such stanchion bars to automatically assume a position wherein their upper ends are spaced apart.

8. Cattle stanchion apparatus as set forth in claim 1, wherein each flap additionally includes an elongated aperture that receives a lifting stud.

9. Cattle stanchion apparatus as set forth in claim 2, wherein each flap additionally includes an elongated temperature compensating aperture that receives a lifting stud.

10. Cattle stanchion apparatus as set forth in claim 3, wherein each flap additionally includes an elongated temperature compensating aperture that receives a lifting stud.

11. Cattle stanchion apparatus as set forth in claim 5, wherein each flap additionally includes an elongated temperature compensating aperture that receives a lifting stud.

12. Cattle stanchion apparatus as set forth in claim 6, wherein each flap additionally includes an elongated temperature compensating aperture that receives a lifting stud.

13. Cattle stanchion apparatus as set forth in claim 7, wherein each flap additionally includes an elongated temperature compensating aperture that receives a lifting stud.

* * * * *